United States Patent
Jarrous et al.

(10) Patent No.: US 9,554,273 B1
(45) Date of Patent: Jan. 24, 2017

(54) USER IDENTIFICATION ON A TOUCHSCREEN DEVICE

(71) Applicant: International Business Machines Corporation, Armonk, NY (US)

(72) Inventors: Ayman Jarrous, Haifa (IL); Eitan Menahem, Beer Sheva (IL); Alexandra Shulman-Peleg, Givataim (IL)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 14/845,451

(22) Filed: Sep. 4, 2015

(51) Int. Cl.
```
G06F 21/36    (2013.01)
H04W 12/06    (2009.01)
H04W 12/08    (2009.01)
G06F 3/0488   (2013.01)
G06F 3/0484   (2013.01)
```

(52) U.S. Cl.
CPC ............ *H04W 12/06* (2013.01); *G06F 3/0484* (2013.01); *G06F 3/04883* (2013.01); *G06F 21/36* (2013.01); *H04W 12/08* (2013.01)

(58) Field of Classification Search
CPC ... H04W 12/06; H04W 12/08; G06F 3/04883; G06F 3/0484; G06F 21/36
USPC ...................................... 455/411, 410, 550.1
See application file for complete search history.

(56) References Cited

U.S. PATENT DOCUMENTS

```
8,892,461  B2   11/2014  Lau et al.
2002/0091937 A1  7/2002  Ortiz
2003/0005326 A1  1/2003  Flemming
2003/0056100 A1  3/2003  Beatson
2006/0259304 A1  11/2006 Barzilay
2007/0097096 A1*  5/2007 Rosenberg ............ G06F 1/1626
                                              345/173
2007/0236330 A1  10/2007 Cho et al.
```
(Continued)

FOREIGN PATENT DOCUMENTS

WO    WO99/09512 A1    2/1999

OTHER PUBLICATIONS

IBM; "Discover Patterns of Authorization Denials to Detect Security Violations"; An IP.com Prior Art Database Technical Disclosure; http://ip.com/IPCOM/000152423; May 3, 2007, p. 1-3.

(Continued)

*Primary Examiner* — Khai M Nguyen
(74) *Attorney, Agent, or Firm* — Daniel J. Swirsky; AlphaPatent Associates Ltd.

(57) ABSTRACT

Embodiments of the present invention may involve identifying a user of a touchscreen device. A touchscreen device may receive a user input. One or more features of the user input on the touchscreen device may be identified. The one or more features of the user input may include, for example, geometric patterns, swiping motifs, a pressure, a spatial orientation, or any combination thereof. A user profile comprising the one or more features of the user input may be generated. The touchscreen device may receive a second input from an unknown user. A statistical evaluation may be performed comparing one or more features of the second input with one or more features of the user input in the user profile. A probability that the unknown user is the user may be determined. If a low probability is determined, the unknown user may be locked out of the touchscreen device.

16 Claims, 7 Drawing Sheets

(56) References Cited

U.S. PATENT DOCUMENTS

| | | | | |
|---|---|---|---|---|
| 2011/0088086 | A1* | 4/2011 | Swink | G06F 3/04883 726/7 |
| 2012/0103729 | A1* | 5/2012 | Finschi | B66B 1/468 187/247 |
| 2012/0254964 | A1 | 10/2012 | Kumar et al. | |
| 2013/0239195 | A1 | 9/2013 | Turgeman | |
| 2013/0288647 | A1 | 10/2013 | Turgeman | |
| 2014/0019912 | A1 | 1/2014 | Zhang et al. | |
| 2014/0049499 | A1* | 2/2014 | Huck | G06F 3/0416 345/173 |
| 2014/0096196 | A1 | 4/2014 | O'Conner et al. | |
| 2015/0033310 | A1 | 1/2015 | Chen et al. | |
| 2015/0040193 | A1 | 2/2015 | Clemons | |
| 2015/0082421 | A1* | 3/2015 | Flowers | G06F 21/00 726/16 |
| 2015/0095829 | A1* | 4/2015 | Uno | G06F 3/04883 715/771 |
| 2015/0113481 | A1* | 4/2015 | Liu | G06F 3/0488 715/843 |
| 2015/0199504 | A1* | 7/2015 | Feng | G06F 21/36 726/28 |

OTHER PUBLICATIONS

Disclosed Anonymously; "Method and System for Enhancing Security"; An IP.com Prior Art Database Technical Disclosure; http://ip.com/IPCOM/000207889; Jun. 15, 2011, p. 1-2.

IPCOM000216184; "Authentication of a user of a mobile electronic device by the use of 3D Facial Mapping"; An IP.com Prior Art Database Technical Disclosure; http://ip.com/IPCOM/000216184; Mar. 23, 2012, p. 1-2.

Harrison et al., "Tap-Sense: Enhancing Finger Interaction on Touch Surfaces", UIST'11, Oct. 16-19, 2011, pp. 1-8.

Feng et al., "Continuous Mobile Authenication Using Touchscreen Gestures", Computer Science Department, University of Houston and School of Computing and Information Sciences, Florida International University, 2012 IEEE, pp. 451-456.

Sae,-Bae et al., "Biometric-Rich Gestures: A Novel Approach to Authentication on Multi-Touch Devices", NYU-Poly, CHI, May 5-10, 2012, Austin, Texas, pp. 977-986.

Angulo et al., "Exploring Touch-Screen Biometrics for User Identification on Smart Phones", Karlstad University, J. Camenisch et al (Eds): Privacy and Identity 2011, IFIP AICT 375, pp. 130-143, 2012.

Mell et al., "The NIST Definition of Cloud Computing", National Institute of Standards and Technology, Special Publication 800-145, Sep. 2011, pp. 1-7.

Shi et al., "Implicit Authentication through Learning User Behavior", M. Burmester et al., (Eds): ISC 2010, LNCS 6531, pp. 99-113, 2011, 15 pages.

IBM, List of IBM Patents or Patent Applications Treated as Related, Appendix P, dated Mar. 21, 2016, 2 pages.

Pending U.S. Appl. No. 14/845,285, filed Sep. 4, 2015, Entitled: "Challenge Generation for Verifying Users of Computing Devices", 23 Pages.

Pending U.S. Appl. No. 14/949,984, filed Nov. 24, 2015, Entitled: "Challenge Generation for Verifying Users of Computing Devices", 20 Pages.

Antal et al., "Identity Information Revealed From Mobile Touch Gestures", Studia Univ. Babes—Bolyai, Informatica, 10th Joint Conference on Mathematics and Computer Science, vol. LIX, Special Issue 1, May 21-25, 2014, Cluj-Napoca, 10 pages.

* cited by examiner

USER IDENTIFICATION ON A TOUCHSCREEN DEVICE

BACKGROUND

The present invention relates generally to the field of computing, and more particularly to user identity verification by typing patterns and shapes on a touch-screen device.

A security system may prevent unauthorized access to sensitive and/or private information. Conventional security systems, however, may hinder usability of a device. For example, a conventional security system may require a long passcode that must be changed periodically. Inputting a long passcode before every use may be impractical and tedious for a user. Thus, there is a need to provide security to a device without hindering usability of the device.

SUMMARY

Embodiments of the present invention disclose a method for identifying a known user of a touchscreen device. The method may include receiving an input on the touchscreen device from an unknown user. The method may include performing a statistical evaluation of one or more features of the input with one or more features of a user input in a user profile. The one or more features of the user input comprise geometric patterns. The method may include determining, based on the statistical evaluation, a probability that the unknown user is the known user.

Embodiments of the present invention disclose a computer program product for identifying a known user of a touchscreen device. The computer program product may comprise a computer readable storage medium having program instructions embodied therewith, where the computer readable storage medium is non-transitory. The program instructions may be executable by a computer to cause the computer to perform a method. The method may include receiving an input on the touchscreen device from an unknown user. The method may include a computer performing a statistical evaluation of one or more features of the input with one or more features of a known user input in a user profile. The one or more features of the user input comprise geometric patterns. The method may include a computer determining, based on the statistical evaluation, a probability that the unknown user is the known user.

Embodiments of the present invention disclose a system for identifying a known user of a touchscreen device. The system may include one or more computer processors, one or more computer-readable storage media, and program instructions stored on the computer-readable storage media for execution by at least one of the one or more processors. The program instructions may include instructions to receive an input on a touchscreen device from an unknown user. The program instructions may include instructions to perform a statistical evaluation of one or more features of the input with one or more features of a known user input in a user profile. The one or more features of the known user input comprise geometric patterns. The program instructions may include instructions determine, based on the statistical evaluation, a probability that the unknown user is the known user.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Embodiments of the present invention may relate to verifying a user identity by analyzing patterns received on a touch-screen device. Conventional security systems may have a tradeoff between security and usability, resulting in multiple unprotected and insecure mobile devices storing sensitive data. Thus, there is a need to verify that the device is not compromised and the person using the mobile is a legitimate user.

Embodiments of the present invention may involve a methodology to verify a known user's identity by comparing an observed typing pattern to a profile constructed for the user. Embodiments of the present invention may involve identifying a user of a touchscreen device. A touchscreen device may receive a user input. The one or more features of the user input may include, for example, geometric patterns, swiping motifs, a pressure, a spatial orientation, or any combination thereof. For example, a one or more two-dimensional user input on a touchscreen may be analyzed. In another example, one or more mobile holding habits of a user may be analyzed. In another example, a one or more two-dimensional user input on a touchscreen and one or more mobile holding habits may both be analyzed. One or more features of the user input on the touchscreen device may be identified. A user profile comprising the one or more features of the user input may be generated. The touchscreen device may receive a second input from an unknown user. A statistical evaluation may be performed comparing one or more features of the second input with one or more features of the user input in the generated user profile. A probability that the unknown user is the user may be determined. If a low probability is determined, the unknown user may be locked out of the touchscreen device. Embodiments of the present invention will now be described in detail with reference to FIGS. 1-6.

Figure 1:
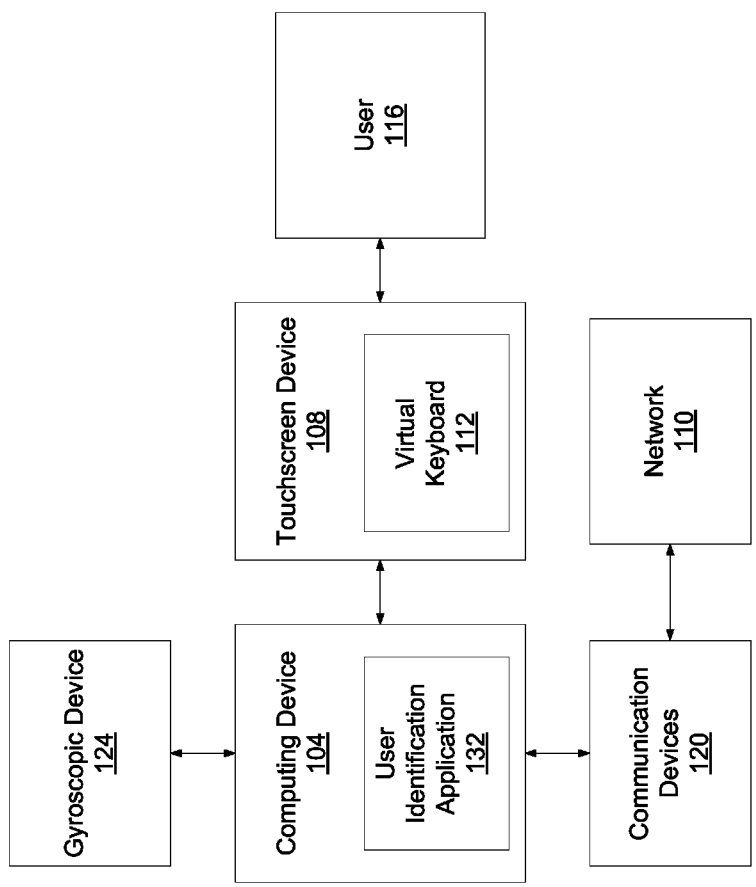
FIG. 1 illustrates a user identification system, in accordance with an embodiment of the present invention.

FIG. 1 is a user identification system 100, according to an aspect of the invention. In an exemplary embodiment, the user identification system 100 may include a computing device 104, a touchscreen device 108, a user 116, communication devices 120, a network 110, and a gyroscopic device 124.

Computing device 104 may be a laptop computer, tablet computer, netbook computer, personal computer (PC), desktop computer, phone, or any programmable electronic device. Computing device 104 may include internal and external hardware components, as depicted and described in further detail with respect to FIG. 4. The computing device 104 may include a user identification application 132. The user identification application 132 may be a program, function, or module of a computer program executable by a processor of the computing device 104 or may be embodied as one or more connected computing systems. User identification system 100 may be implemented using a computing node such as the cloud computing node of FIG. 4.

The touchscreen device 108 may be any input device known in the art, such as, for example, an input device layered on top of an electronic visual display. The touchscreen device may display one or more images, such as, for example, a virtual keyboard 112, a virtual grid, a shape, a picture, text, or any combination thereof. The touchscreen device 108 may allow the user 116 to react to what is displayed and to control how it is displayed. For example, the user 116 may react to the virtual keyboard 112 displayed on the touchscreen device 108 by swiping across the virtual keyboard 112. In another example, the user 116 may react to a virtual grid (e.g. a set of lines and/or dots) by swiping across the virtual grid. In another example, the user 116 may react to what is displayed by swiping up or down to scroll through text. In another example, the user 116 may control how information is displayed by zooming in or out of a displayed image.

Communication device 120 may include any communication device known in the art, such as, for example, a Bluetooth device, Wi-Fi device, near-field communication (NFC) device, radio frequency device, or any combination thereof. Communication device 120 may communicate with the network 110.

Network 110 may be any combination of connections and protocols that will support communications between a server and the computing device 104. In an embodiment, network 110 may be the Internet, representing a worldwide collection of networks and gateways to support communications between devices connected to the Internet. Network 110 may include, for example, wired, wireless or fiber optic connections. In other embodiments, network 110 may be implemented as an intranet, a local area network (LAN), a wide area network (WAN), or a combination thereof. Network 110 may include wired connections, wireless connections, fiber optic connections, or a combination thereof.

The gyroscopic device 124 may include any orientation measuring device known in the art, such as, for example, a gyrostat, microelectromechanical system gyroscope, fiber optic gyroscope, hemispherical resonator gyroscope, vibrating structure gyroscope, dynamically tuned gyroscope, ring laser gyroscope, London moment gyroscope, quantum gyroscope, magnetic compass, or any combination thereof. In an embodiment, the gyroscopic device 124 may be used to determine an orientation of the touchscreen device 108, as discussed in FIG. 2.

Figure 2:
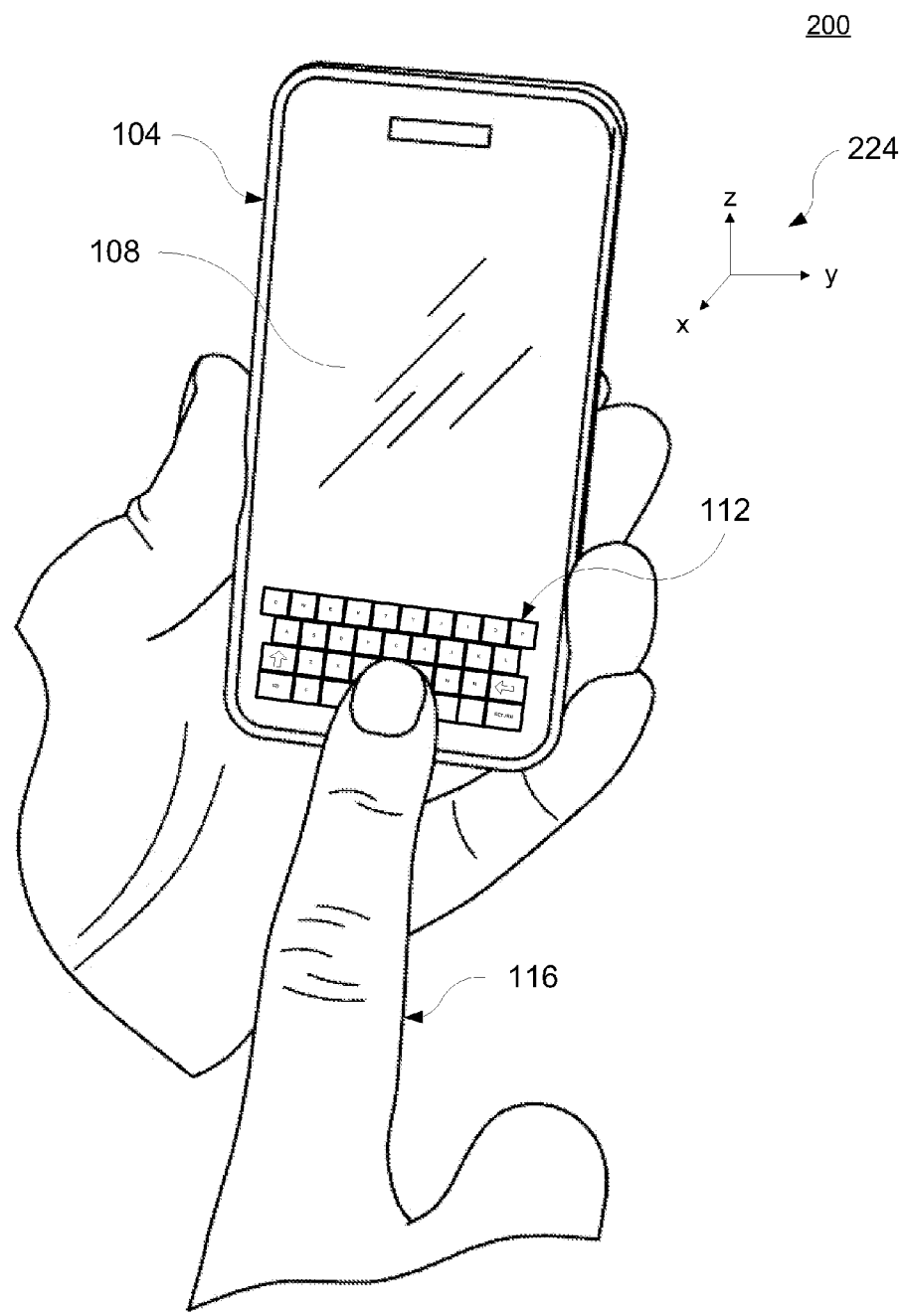
FIG. 2 illustrates a user identification environment, in accordance with an embodiment of the present invention.

FIG. 2 is a user identification environment 200, according to an aspect of the invention. The user identification environment 200 is a non-limiting example of an environment encompassing the user identification system 100. In an embodiment, the user identification environment 200 may include the computing device 104, the touchscreen device 108, the virtual keyboard 112, the user 116, and the gyroscopic device 124 (not shown). The computing device 104, as depicted in FIG. 2, may be a smart phone with a built in touchscreen device 108. The touchscreen device 108 may display the virtual keyboard 112.

In an embodiment, the user 116 may generate a geometric pattern on the touchscreen device 108. A geometric pattern may be a pattern generated by a user on a touchscreen device having a width, length, and/or one or more curves. The width of the pattern may be associated with, for example, a width of a finger of the user 116, a pressure applied by the user against a surface of the touchscreen device 108, or any combination thereof. In an embodiment, the user 116 may generate a geometric pattern on the virtual keyboard 112 on the touchscreen device 108. In another embodiment, the user 116 may generate a geometric pattern on a virtual grid (e.g. a array of dots and/or lines). In another embodiment, the user 116 may generate a geometric pattern by, for example, zooming into an image on the touchscreen device 108, scrolling through text on the touchscreen device 108, swiping from one image to another on the touchscreen device 108, or any combination thereof. The user 116 may generate a geometric pattern using, for example, a finger, stylus, eye movement, another controlling mechanism, or combination thereof. In an embodiment, a processor in the computing device 104 may utilize an algorithm provided by the user identification application 132 (FIG. 1) to analyze one or more geometric patterns to identify, for example, one or more curves, dots, point contacts, swipes, or other geometric descriptors associated with a geometric pattern generated by the user 116.

In another embodiment, one or more geometric patterns may be compiled to describe user swiping habits or swiping motifs, as is further discussed below with reference to FIG. 3. A swiping motif may include, for example, one or more curves, dots, point contacts, swipes, other geometric shape, swipe speed, direction, or any combination thereof. In an embodiment, a pattern for typing "HELLO" on the virtual keyboard 112 may include one or more dots on a capitalization function, one or more swipes across the virtual keyboard 112, and one or more curves on the virtual keyboard 112. In addition, typing "HELLO" may include one or more directions, one or more speeds, and one or more pressures. When the user 116 types "HELLO" one or more times, one or more patterns, directions, speeds, or pressures may be compiled to generate a swiping motif for the user 116 for typing the word "HELLO". In another embodiment, a pattern for unlocking an application and/or device may include generating a shape similar to a "Z" on a virtual grid. When the user 116 draws the Z-like shape, one or more patterns, directions, speeds, or pressures may be compiled to generate a swiping motif for the user 116 associated with drawing the Z-like shape. For example, the user 116 may move a finger quickly and with substantial pressure across a top portion of the touchscreen device 108, followed by a slow lighter pressured diagonal line, followed by a quick low pressure horizontal line to complete the Z-like shape. In another example, each time the user 116 changes direction while drawing the Z-like shape on the virtual grid, one or more curves unique to the user 116 may be generated. One or more geometric patterns and/or one or more swiping motifs may be compiled and analyzed to generate a user profile for the user 116, as is discussed with reference to FIG. 4.

In another embodiment, the touchscreen device 108 may detect one or more other swiping features which may be utilized to generate a user profile for the user 116. Other swiping features may include, for example, a pressure on the touchscreen device 108, a size of a contact area on the touchscreen device 108, an angle of a contact on the touchscreen device 108, one or more typing modes such as tapping or sliding, or any combination thereof. A pressure on the touchscreen device 108 may be generated, for example, by the user 116 pressing a finger or stylus against the touchscreen device 108. For example, the user 116 may generate a light pressure when swiping on the virtual keyboard 112, a medium pressure when swiping from image to image, and a heavy pressure when tapping. A size of a contact area may vary, for example, by a size of a finger of the user 116, a size of a stylus used by the user 116, or any combination thereof. An angle of contact may vary, for example, based on a particular way a user 116 holds the touchscreen device 108. For example, the user 116 may hold the touchscreen device 108 in a more vertical orientation, i.e. more in alignment with a z-axis of an x-y-z axis 224, resulting in a more perpendicular angle between a finger of the user 116 and an outer surface of the touchscreen device 108. One or more pressure patterns, one or more contact sizes, one or more contact angles, and one or more typing modes associated with one or more activities may be compiled and analyzed to generate a user profile for the user 116, as is further discussed with reference to FIG. 4.

In another embodiment, the user 116 may hold the touchscreen device 108 at an orientation on the x-y-z axis 224 detected by the gyroscopic device 124 (FIG. 1). One or more orientations on the x-y-z axis 224 may be associated with one or more activities performed by the user 116. One or more associations between the one or more orientations on the x-y-z axis 224 and the one or more activities performed by the user 116 may be compiled and analyzed to generate a user profile, as is discussed with respect to FIG. 4.

Figure 3:
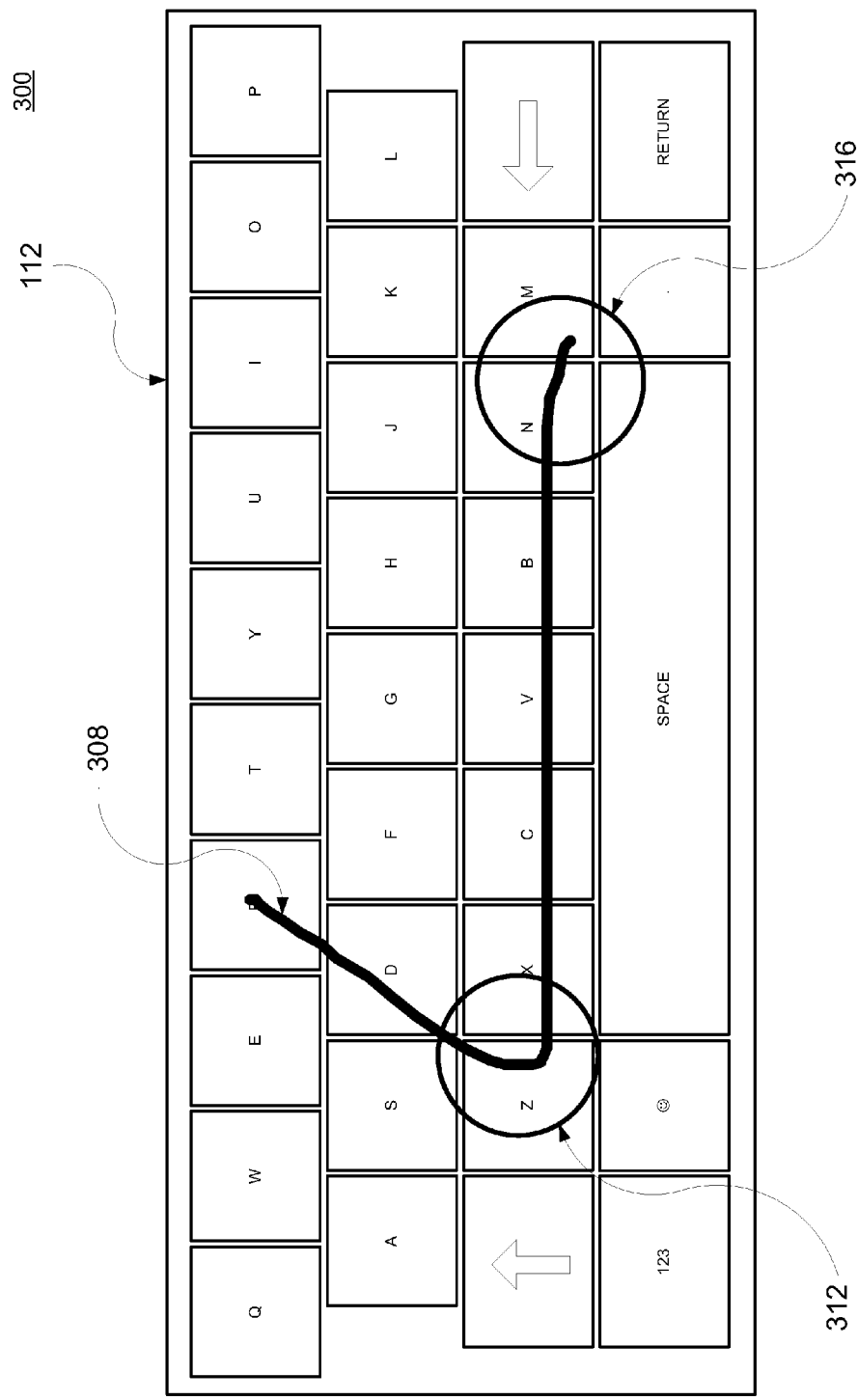
FIG. 3 illustrates a swiping motif, in accordance with an embodiment of the present invention.

FIG. 3 illustrates a swiping motif, in accordance with an embodiment of the present invention. In an embodiment, one or more geometric patterns may be compiled to describe user swiping habits or swiping motifs. A swiping motif may include, for example, one or more curves, dots, point contacts, swipes, other geometric shape, swipe speed, direction, or any combination thereof.

In an embodiment, a pattern 308 may be formed across the virtual keyboard 112 on the touchscreen device 108. The virtual keyboard 112 may be, for example, a QWERTY keyboard. The pattern 308 may include a first relatively straight portion running from a letter "R" to a letter "Z", a first curved portion 312 near a letter "Z", a second relatively straight portion running from the letter "X" to the letter "N", and a second curved portion 316 running from the letter "N" to the letter "M". The first curved portion 312 may be a distinctive feature produced by the user 116 (FIG. 1), for example, when the user 116 makes a sharp direction change or when the user 116 types a particular word. The second curved portion 316 may be a distinctive feature produced by the user 116, for example, when the user 116 completes a word or when the user 116 begins a word. A processor within the computing device 104 (FIG. 1) may analyze each portion of the pattern 308 to determine which portions may contain distinctive features. One or more portions of the pattern 308 or the pattern 308 in its entirety may be saved in a computer readable storage medium in, for example, the computing device 104. A second pattern formed on the touchscreen device 108 (FIG. 1) may be compared to one or more portions of the pattern 308 or the pattern 308 in its entirety to determine an identity of a user who formed the second pattern.

Figure 4:
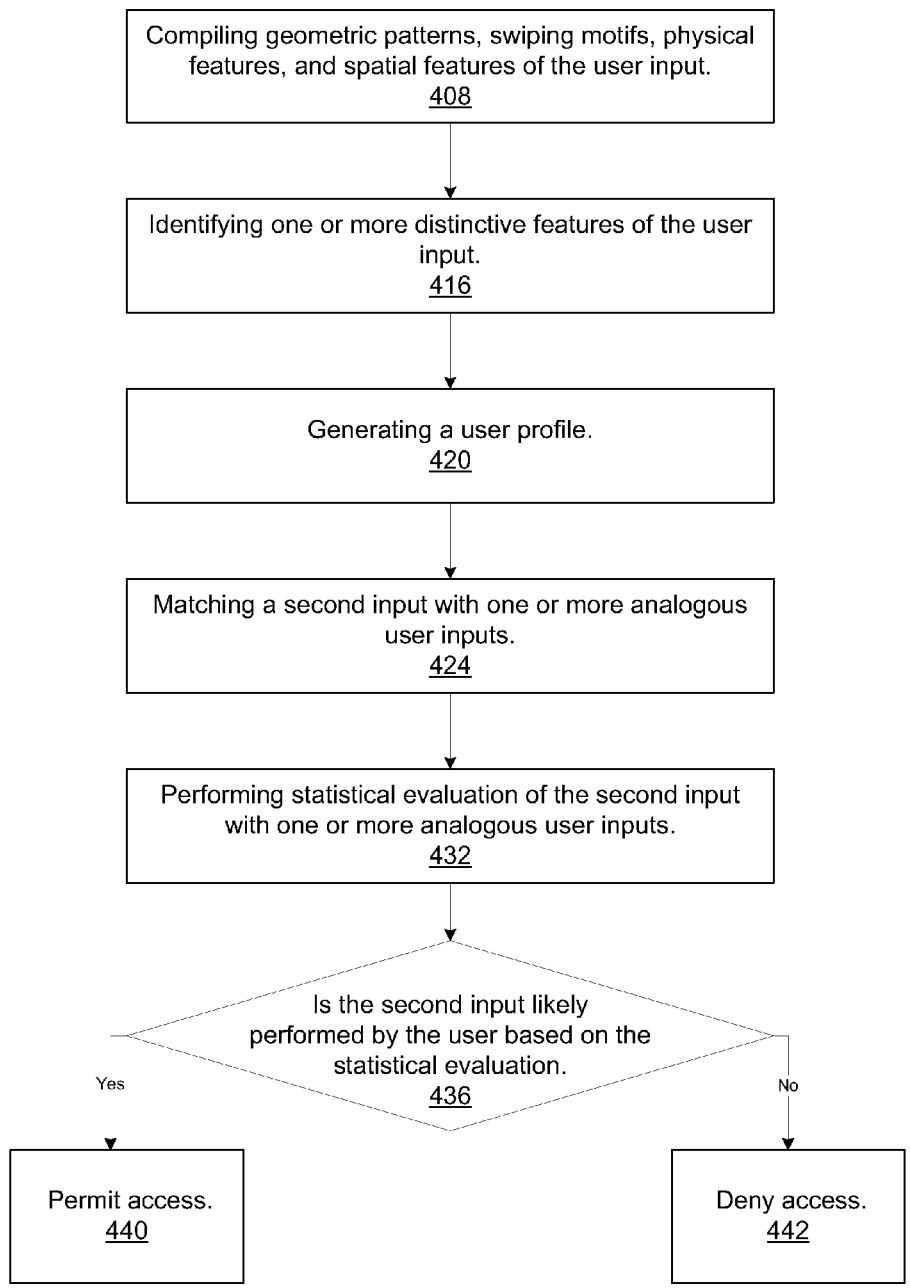
FIG. 4 is a flow chart of a method for identifying a user, in accordance with an embodiment of the present invention.

FIG. 4 is a flowchart of a method 400 of identifying a user, using the user identification system 100 of FIG. 1, in accordance with an embodiment of the present invention. Steps of method 400 may be executed using a processor of a computer that encompasses, or is part of, the user identification system 100, or another system. In an embodiment, a method 400 of identifying a user may involve compiling geometric patterns, swiping motifs, physical features, and special features of a user input (hereinafter "compiling 408"), identifying one or more distinctive features of the user input (hereinafter "identifying distinctive features 416" or "identified distinctive features 416"), generating a user profile 420, matching a second input with one or more analogous user inputs (hereinafter "matching 424"), performing a statistical evaluation of the second input with one or more analogous user inputs (hereinafter "statistical evaluation 432"), determining whether the second input was performed by the user based on the statistical evaluation (hereinafter "determining user 436"), permitting authentication 440 (hereinafter "permitting access" or "permitting authentication"), and denying authentication 442 (hereinafter "denying access" or "denying authentication").

Compiling 408 may involve detecting and saving geometric patterns, swiping motifs, physical features, and special features of a user input on a computer readable storage medium. The computer readable storage medium may be located, for example, on the computing device 104 (FIG. 1), the touchscreen device 108, a cloud computing device, or any combination thereof. In an embodiment, compiling 408 may include classifying types of information and storing information into classified groups, which may, for example, decrease information retrieval time.

Identifying distinctive features 416 may involve analyzing one or more patterns formed by the user 116 (FIG. 1). In an embodiment, a processor in the computing device 104 may isolate features of one or more patterns formed by the user 116 to identify which features may qualify as distinctive features. A distinctive feature may include, for example, one or more geometric patterns, swiping motifs, physical features, spatial features, or any combination thereof. In an embodiment, a distinctive feature may alone or in combination with one or more other features fall outside of a standard deviation of a statistically ordinary feature.

Generating the user profile 420 may involve associating one or more activities performed on the touchscreen device 108 (FIG. 1) with one or more identified distinctive features 416. One or more activities performed on the touchscreen device 108 may include, for example, typing a word on a virtual keyboard 112 (FIG. 1), scrolling through text, swiping through images, etc.

Matching 424 may involve a second input on the touchscreen device from an unknown user which may be compared with one or more analogous user inputs. In an embodiment, when a second input is received on the touchscreen device, a search may be performed through the user profile 420 to find one or more user inputs associated with one or more activities. For example, the second input may be typing the word "HELLO" on the touchscreen device 108 (FIG. 1) which may trigger a search for one or more user inputs involving typing the word "HELLO". Typing the word "HELLO" by the second input and the one or more user inputs may be analogous inputs. Analogous inputs may involve performing a same or similar activity, for example, typing a same word, typing a similar word, scrolling through text, swiping through images, pressure on the touchscreen device while typing or swiping a word, an orientation of holding a phone, or any combination thereof. Since, in an embodiment, one or more activities may be categorized for efficient lookup, the matching 424 of the second input with the one or more user inputs may be performed quickly.

Statistical evaluation 432 may involve comparing the second input with one or more analogous user inputs. In an embodiment, a distinctive feature of one or more analogous user inputs may be compared with the second input. In another embodiment, a pattern in its entirety of one or more analogous user inputs may be compared with the second input. The statistical evaluation 432 may involve calculating a statistically ordinary feature of one or more user inputs. One or more statistically ordinary features of one or more user inputs may be compared with one or more analogous features of the second input. The statistical evaluation 432 may be used to determine, for example, whether one or more features of the second input is within a standard deviation of one or more analogous features of one or more user inputs.

Determining user 436 may involve evaluating one or more statistical evaluations 432 of the second input compared to the user input. For example, if a substantial number of statistical evaluations 432 determine that a feature of the second input is outside a standard deviation of a statistically ordinary feature of one or more user inputs, it may be determined that the second input was not performed by the user 116 (FIG. 1). In another example, if a substantial number of statistical evaluations 432 determine that a feature of the second input is within a standard deviation of a statistically ordinary feature of one or more user inputs, it may be determined that the second input was performed by the user 116. In an embodiment, determining user 436 may weigh some features heavier than others, such as, for example, a distinctive feature of the user 116. In an embodiment, if determining user 436 determines that the second input is performed by the user 116, the second input may be included in compiling 408.

Permitting access 440 and denying access 442 may be based on the determining user 436. For example, if there is a high probability, based on the determining user 436, that the second input was formed by the user 116, then permitting access 440 may occur. In another example, if there is a low probability, based on the determining user 436, that the second input was formed by the user 116, then denying access 442 may occur. Permitting access 440 may allow a user to access one or more devices, one or more applications, or any combination thereof. For example, permitting access 440 may allow the user 116 to unlock a touchscreen device 108. In another example, permitting access 440 may allow the user 116 to access an application on a cloud computing node. Denying access 442 may prevent an unknown or unauthorized user from accessing one or more devices, one or more applications, or any combination thereof. For example, denying access 442 may prevent an unknown or unauthorized user from accessing an application on a cloud computing node.

In an embodiment, compiling 408, identifying distinctive features 416, generating a user profile 420, matching 424, statistical evaluation 432, determining user 436, permitting access 440, and denying access 442 may be performed by a computing node, as is described below with reference to FIG. 5. In an embodiment, the computing node may be a local device, such as, for example, the computing device 104 (FIG. 1). In another embodiment, the computing node may be a remote computing device, such as, for example, a cloud computing node.

Figure 5:
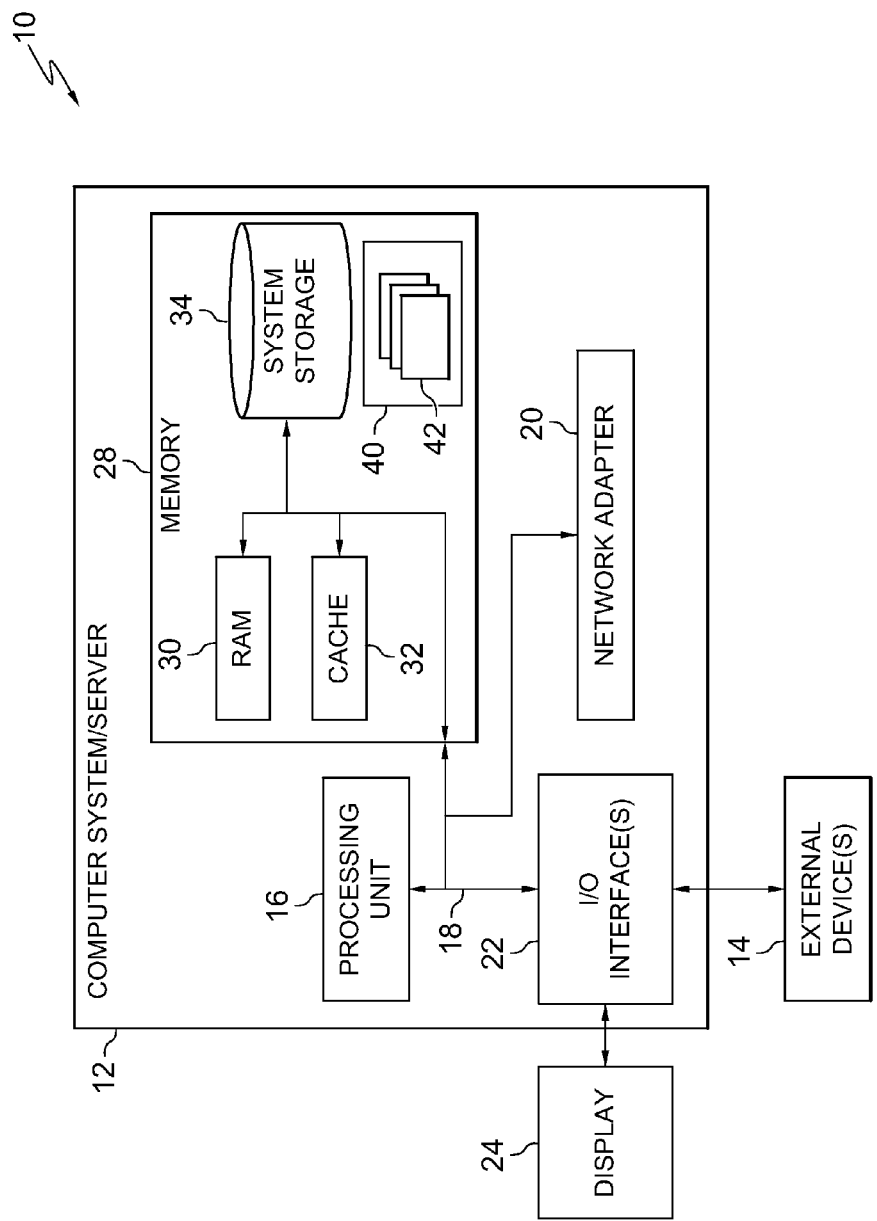
FIG. 5 depicts a block diagram of components of the proxy server computer, in accordance with an embodiment of the present invention.

Referring now to FIG. 5, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
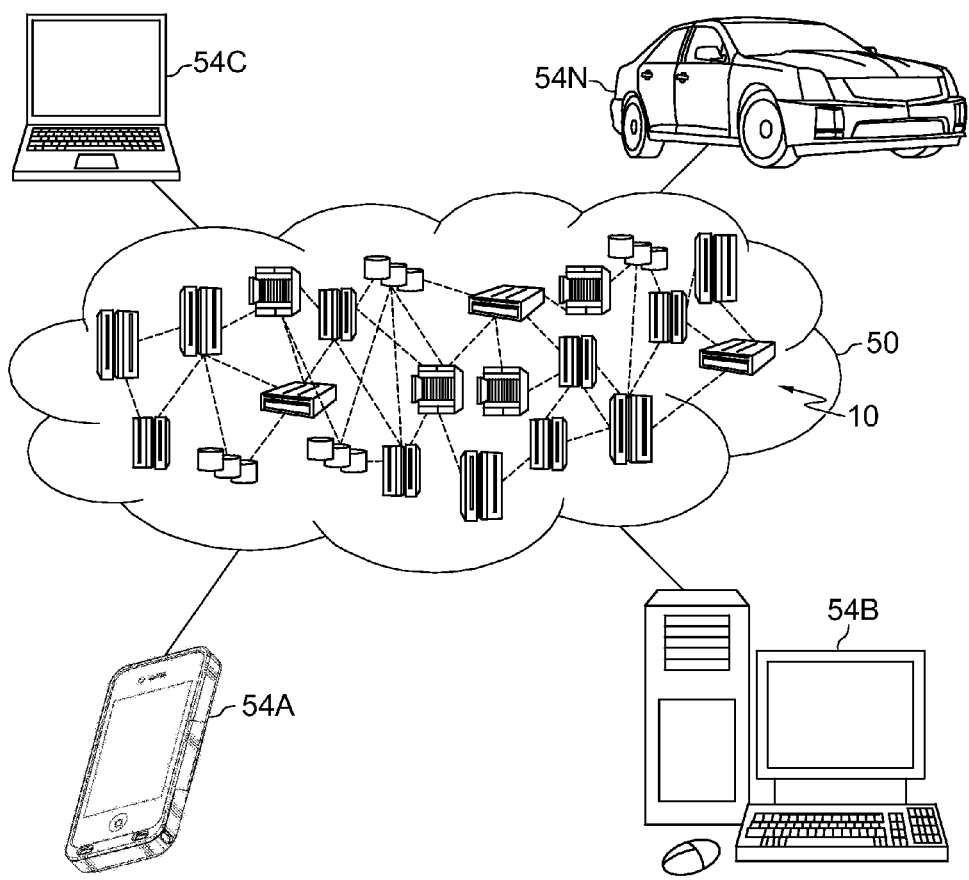
FIG. 6 depicts a cloud computing environment, in accordance with an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 7:
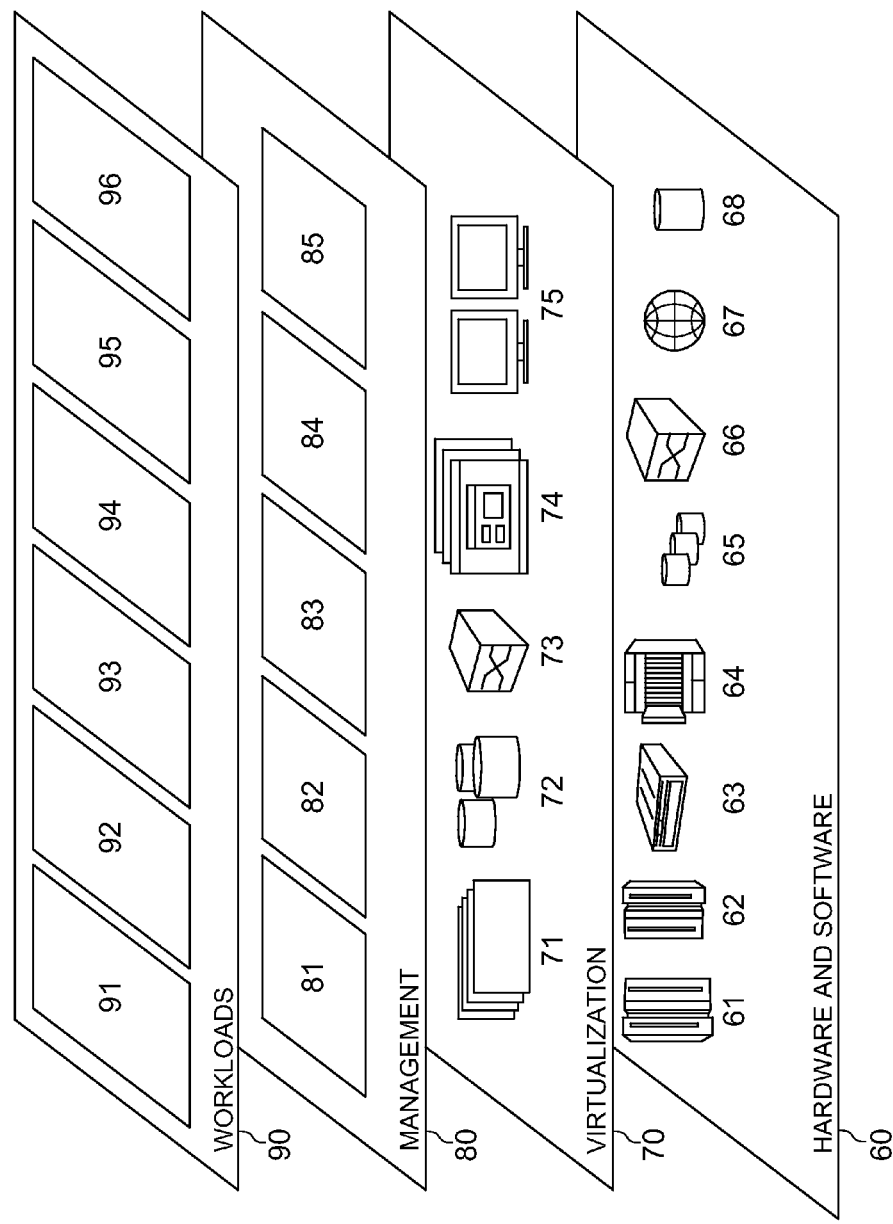
FIG. 7 depicts a set of functional abstraction layers provided by cloud computing environment, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and user identification system 96.

In a related embodiment, cloud migration services may be performed as part of management layer 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A method for determining that an unknown user is a known user of a touchscreen device, the method comprising:
receiving an input via a touchscreen device from an unknown user during an activity performed by the unknown user;
determining, during the activity performed by the unknown user, a spatial orientation of the touchscreen device on an x-y-z axis in association with the input received from the unknown user;
performing a statistical evaluation whereby one or more features of the input received from the unknown user, in combination with the spatial orientation of the touchscreen device associated with the input received from the unknown user, are compared with one or more features of analogous input, previously received from a known user via the touchscreen device during an activity performed by the known user, in combination with a spatial orientation of the touchscreen device on the x-y-z axis associated with the input previously received from the known user during the activity performed by the known user, wherein the input previously received from the known user and the spatial orientation of the touchscreen device associated with the input previously received from the known user are stored in a profile associated with the known user; and determining, based on the statistical evaluation, a probability that the unknown user is the known user.

2. The method of claim 1, further comprising:

denying authentication of the unknown user based on the probability that the unknown user is the known user falling below a threshold value.

3. The method of claim 2, wherein denying authentication prevents the unknown user from accessing one or more of the touchscreen device, a function of the touchscreen device, a remote computing device, and an application.

4. The method of claim 1, wherein determining, based on the statistical evaluation, the probability that the unknown user is the known user is performed by a cloud computing node.

5. The method of claim 1, further comprising:

identifying the one or more features of the user input on the touchscreen device; and generating the user profile comprising the one or more features of the user input.

6. The method of claim 1, wherein the one or more features of the user input comprise a swiping motif.

7. The method of claim 1, wherein the one or more features of the user input comprise a pressure applied to the touchscreen device.

8. A computer program product for determining that an unknown user is a known user of a touchscreen device, the computer program product comprising:

a non-transitory, computer-readable storage medium; and computer-readable program code embodied in the non-transitory, computer-readable storage medium, where the computer-readable program code is configured to:

receive an input via a touchscreen device from an unknown user during an activity performed by the unknown user, determine, during the activity performed by the unknown user, a spatial orientation of the touchscreen device on an x-y-z axis in association with the input received from the unknown user, perform a statistical evaluation whereby one or more features of the input received from the unknown user, in combination with the spatial orientation of the touchscreen device associated with the input received from the unknown user, are compared with one or more features of analogous input, previously received from a known user via the touchscreen device during an activity performed by the known user, in combination with a spatial orientation of the touchscreen device on the x-y-z axis associated with the input previously received from the known user during the activity performed by the known user, wherein the input previously received from the known user and the spatial orientation of the touchscreen device associated with the input previously received from the known user are stored in a profile associated with the known user, and determine, based on the statistical evaluation, a probability that the unknown user is the known user.

9. The computer program product of claim 8, wherein the computer-readable program code is configured to identify the one or more features of the user input on the touchscreen device, and generate the user profile comprising the one or more features of the user input.

10. The computer program product of claim 8, wherein the computer-readable program code is configured to deny authentication of the unknown user based on the probability that the unknown user is the known user falling below a threshold value.

11. The computer program product of claim 8, wherein the one or more features of the user input comprise a pressure applied to the touchscreen device.

12. A computer system for determining that an unknown user is a known user of a touchscreen device, the computer system comprising:

one or more computer processors;

one or more non-transitory, computer-readable storage media;

program instructions stored on the non-transitory, computer-readable storage media for execution by at least one of the one or more computer processors, the program instructions configured to receive an input via a touchscreen device from an unknown user during an activity performed by the unknown user, determine, during the activity performed by the unknown user, a spatial orientation of the touchscreen device on an x-y-z axis in association with the input received from the unknown user, perform a statistical evaluation whereby one or more features of the input received from the unknown user, in combination with the spatial orientation of the touchscreen device associated with the input received from the unknown user, are compared with one or more features of analogous input, previously received from a known user via the touchscreen device during an activity performed by the known user, in combination with a spatial orientation of the touchscreen device on the x-y-z axis associated with the input previously received from the known user during the activity performed by the known user, wherein the input previously received from the known user and the spatial orientation of the touchscreen device associated with the input previously received from the known user are stored in a profile associated with the known user, and determine, based on the statistical evaluation, a probability that the unknown user is the known user.

13. The system of claim 12 wherein the program instructions are configured to identify the one or more features of the user input on the touchscreen device; and generate the user profile comprising the one or more features of the user input.

14. The system of claim 12 wherein the program instructions are configured to deny authentication based on the probability that the unknown user is the known user falling below a threshold value.

15. The system of claim 12, wherein the one or more features of the user input comprise a swiping motif.

16. The system of claim 12, wherein the one or more features of the user input comprise a pressure applied to the touchscreen device.

* * * * *